Jan. 13, 1942.   K. E. CROOKS   2,269,926
COMPOSITE BOARD FLOORING
Original Filed Jan. 6, 1939
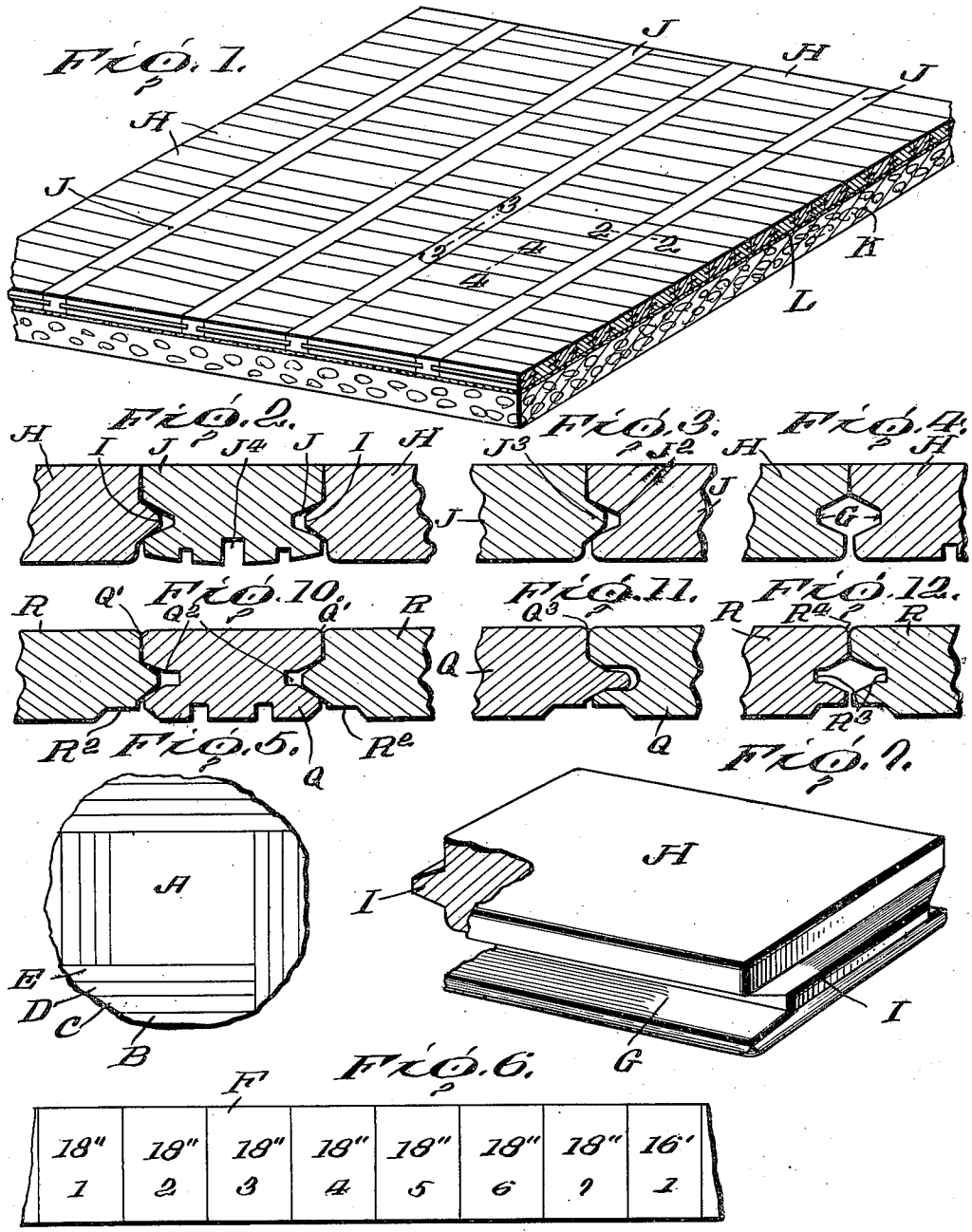
INVENTOR
K. E. Crooks
By Patterson Wright & Patterson
ATTORNEYS Patented Jan. 13, 1942

2,269,926

UNITED STATES PATENT OFFICE 2,269,926

COMPOSITE BOARD FLOORING

Kenneth E. Crooks, Williamsport, Pa.

Original application January 6, 1939, Serial No. 249,647. Divided and this application June 23, 1939, Serial No. 280,878

7 Claims. (Cl. 20—7)

This invention relates to a new construction of flooring composed of boards and sectional stiles arranged at an angle to each other and interlocked together by a tongue and groove connection to allow the boards to expand and contract independent of each other between the stiles and is a division of my application, Serial No. 249,647, filed Jan. 6, 1939, covering a composite board flooring and method of laying the same, the main object of my invention being to provide a floor, the major portion of which is constructed of floor boards of undetermined promiscuous widths, whereby the ordinary 10 to 25% ripping waste in producing flooring to predetermined dimensions can be reduced to a great extent, thereby enabling a floor to be constructed very economically.

One of the principal objects of my invention is to provide low cost flooring units by reducing lumber waste, machine operations at the factory, speeding up installation and practically eliminating the high servicing costs due to expansion long after the floors are in use—a condition which has always existed in strip and block flooring now in general use as by my particular construction of flooring units provision is made for practically confining expansion and contraction to two directions as each row of floor units is free to move between the guide stiles and each floor unit is free to move in respect to the adjacent unit so that the floor units are guided and held in their proper position as they expand and contract.

As far as I am aware I am the first in the art to produce a board floor, the greater portion of which is formed of boards of undetermined promiscuous widths varying to the fraction of an inch arranged on a layer of mastic disposed on a subfloor with the ends of the boards in alignment with one another and connected at their ends to sectional stiles by tongue and groove connection to allow the boards to move freely between the stiles as they expand and contract in rows extending the width or length of the room. Prior to my invention, flooring, either in strip or block form, was manufactured having either a predetermined width or a predetermined size which caused a great deal of waste as boards cut from logs vary greatly in width and when, for example, 3" strip flooring is manufactured from a board 9" in width, there is over two inches offal in each board and in many instances this offal varies from one to three inches according to the width of the flooring being manufactured as the offal in manufacturing tongue and groove flooring of a predetermined width is from 10 to 20% of the board from which it is formed.

A floor constructed in accordance with my invention not only greatly reduces waste as to width but waste as to length as the last floor board cut from a commercial board will vary according to length but can be used in forming an ornamental design of flooring by arranging a row of short boards alongside a row of boards of greater length whereby I am able to use practically the entire commercial board as now sold as lumber in manufacturing flooring.

In constructing a floor board in accordance with my invention, it is only necessary to skin the edge of the commercial board, dress one face to even thickness and cut the boards in predetermined lengths and they are ready to be assembled between the stiles irrespective of the width of the boards in the adjacent row as I arrange these boards in each row with their ends interlocked to the stiles so as to form a floor of plurality of rows of boards of undetermined promiscuous widths and different lengths movably mounted between the stiles.

Another object of my invention is to provide a floor which is especially adapted to be laid in adhesive material such as plastic mastic, mastic grooves being formed in the side edges of the boards and their respective ends connected to stiles by a tongue and groove connection whereby each board is allowed to move in respect to the adjacent board as the board expand and contract.

Another object of my invention is to provide a flooring which can be finished at the factory and laid rapidly by unskilled workmen in mastic on a subfloor so that no further operation is required, thereby greatly reducing the cost of forming a complete floor.

In my construction of flooring, a floor board forming one of the flooring units can be cut from a board of any width in different lengths and assorted into flooring units of predetermined length, thereby reducing waste to a minimum as by assembling units of various lengths into rows between stiles, the desired ornamental effect can be produced in forming a floor and yet the floor boards will be allowed freely to expand and contract between the stiles.

Other and further objects and advantages of the invention will be hereinafter set forth and the novel features thereof defined by the appended claims.

In the drawing,

Figure 1 is a perspective view of an embodiment of my invention in which sectional stiles are used to form a tongue and groove connection between the ends of flooring boards, the stiles being arranged in spaced relation to one another to form guideways in which the flooring units are slidably mounted so as to allow each flooring unit to expand and contract independently and yet be held in position on the subfloor by the sectional stiles;

Figure 2 is a section taken on line 2—2 of Figure 1, the subfloor being omitted;

Figure 3 is a section taken on line 3—3 of Figure 1, the subfloor being omitted;

Figure 4 is a section taken on line 4—4 of Figure 1, the subfloor being omitted;

Figure 5 is an end view of a log showing one of the methods now in use in cutting a log into boards of various widths;

Figure 6 is a plan view of a commercial board showing in dotted lines the cross cutting of the board to form flooring units of promiscuous undetermined widths and different lengths;

Figure 7 is a perspective view of one of the flooring boards;

Figure 8 is a detail section through a stile and a portion of the adjacent floor boards showing a modified form of tongue and groove connection;

Figure 9 is a section through a stile and the adjacent portion of the floor boards showing still another modified form of tongue and groove connection;

Figure 10 is a section showing a slightly modified form of stile and floor unit, with their upper edges rounded in order to allow the unit and stile to be prefinished;

Figure 11 is a detail section through the abutting ends of the sections of the stiles showing a modified form of tongue and groove connection with their upper edges rounded; and Figure 12 is a detail section through a pair of floor boards showing a modified form of mastic receiving groove, the upper edges being rounded.

In carrying out my invention the floor boards are constructed of commercial lumber, the product of the run of the mill, in the following manner: In sawing up a log A as disclosed in Figure 5, a slab B is first cut off the log and boards C, D and E are then cut off in succession which vary in width from 4 to 12" depending upon the size of the log. This is only an example to illustrate the various differences in width of the boards cut from a log and it is, of course, understood that the larger the log, the greater the width would be of some of the boards cut therefrom. In the manufacture of commercial lumber, the boards are then edged by sawing and sold as commercial lumber and vary in width as low as a fraction of an inch.

The length of the board is determined in the general practice of sawing now in use by the length of the log and as an example, I start with a board F 12' in length as disclosed in Figure 6. The boards are first saw skinned to straighten and produce parallel edges and then grooved as shown at G and then dressed. Now if I desire to form a floor unit 18" long, one end of the board is first squared and by cross cutting I am able to cut seven floor units 1, 2, 3, 4, 5, 6 and 7 H therefrom 18" long, leaving an end piece a little over 16" long as in sawing I lose ⅛" each time a cross cut is made. That left over piece is then cut to 16" in length which is collected and arranged with a similar piece left from cutting up another board and these pieces forming flooring units 16" long can be arranged in rows alongside of flooring units 18" long to form an ornamental floor or a floor can be formed entirely of 16" or 18" flooring units or associated with units of other dimensions as it is only necessary to arrange the flooring units in rows of the same length.

In carrying out my invention it is only necessary that these flooring boards be arranged in rows on the mastic disposed on the subfloor, the boards of one row being of predetermined length irrespective of the length of the adjacent row. This will illustrate how commercial boards vary as small as a fraction of an inch in width and can be cut into different lengths to be used to form a composite floor so as to eliminate waste in forming the flooring boards.

Now another important feature of my invention is the utilization of commercial boards from which floor boards are cut of undetermined promiscuous widths as the width of the commercial board is only reduced by the skinning operation. These floor boards are then passed through the edge grooving machine to groove both edges and then run through the end matching machine to produce tongues on both ends of substantially V-shape in cross section as disclosed in Figures 1 to 4.

Now in manufacturing flooring either in strip or block form, it is made to certain predetermined dimensions at least as to width which causes a lot of waste and it must be apparent as for example when 3" width tongue and groove flooring is cut from a commercial board approximately 12" wide, there is a waste of over 2" in the edging cut therefrom while with my construction this is practically eliminated as I only skin the edges and practically use the entire width of the commercial board which varies in width as low as a fraction of an inch. By eliminating the waste in forming a tongue, I thereby affect a saving in lumber of from 25% to 33⅓% in converting flooring measure into room, surface or square measure.

The grooves G in the side edges are preferably substantially V-shape in cross section and the tongue I on the ends are substantially V-shape in cross section to allow the boards to be readily interlocked with the grooves of the stiles J as shown in Figures 1 to 4 of the drawing, and the tongues and grooves are constructed on the broad principle as disclosed in my Patent No. 2,008,244, dated July 6, 1935, in order to reduce the area of contact and to obtain a wedging action and a hinge joint between the units so as to produce a self-leveling flooring.

The stiles are formed of sections having substantially V-shaped grooves J' along their side edges and the ends of the sections of the stiles are end matched by forming a substantially V-shaped groove J² in one end and a substantially V-shaped tongue J³ on the other end to form an interlocking connection between the sections of the stiles. The under side of the stile is preferably formed with one or more mastic receiving grooves J⁴.

In the construction of stile disclosed in Figures 1 to 4 the under side of each section is rounded transversely to allow the sections to rock on the subfloor to facilitate the assembling of the flooring units. When the subfloor is uneven and the surface is not in a true horizontal plane, the stile can be rocked to form a tongue and groove connection between the boards and stiles and if a row of floor boards have previously been laid, the rounding of the stile on its under surface facilitates the placing of a section of a stile over the tongues of the boards in laying the flooring.

The grooves in the units form pockets in the joints between the units to receive any mastic which is either forced into the same in laying or which might creep up between the units. The mastic enters these grooves and keys the units to the subfloor. It will be noted that the rounded lower edges of the boards and stiles not only facilitate the laying of the units but prevents excess mastic from being forced into the grooves as the units are positioned against one another and prevents the mastic from being forced upwardly on the surface of the unit and discoloring the same.

By dispensing with the interlocking connection between the side edges of the boards and interlocking the boards to the stiles at their ends only I am able to lay the floor more rapidly as it is only necessary to move the unit downwardly against the laid unit in assembling units to interlock them together but in laying double tongue and groove block flooring, it is necessary to move the block in two directions in assembling a block after being laid in the mastic to form a tongue and groove connection with the tongue and groove of the adjacent block.

When a floor is constructed as disclosed of units of various widths and different lengths, each unit in each row is allowed to move in respect to each other between the stiles to compensate for expansion and contraction. While I have shown a floor constructed of units of different lengths to obtain an ornamental effect, it is, of course, understood that the floor can be formed of units of all the same length without departing from the spirit of my invention.

In the construction of composite floor as herein shown and described, the stiles are the only floor units of the complete floor which are preformed as to width and as these stiles are narrow and only constitute such a small proportion of the complete floor, the cost of manufacturing the same is not increased to any extent and as these stiles have their abutting ends in engagement with one another and are engaged by the ends of the boards, the boards have the tendency to hold the stiles to the subfloor and the stiles have the tendency to hold the boards to the subfloor as by forming boards of various widths, in the majority of instances the end of the board straddles the joint of the sections of the stile so that they are interlocked together in such a manner that it has been found in practice that while the boards are free to move and expand and contract, they are held firmly to the subfloor by the adhesion of the mastic.

In laying a floor constructed in accordance with my invention, the upper surface of the subfloor K is coated with plastic adhesive material such as plastic mastic L and either a stile J or a row of floor boards H are first laid on the mastic and the stiles and units are interlocked together by the tongue and groove connection until the subfloor is completely covered.

In practice, my floor is so designed that it lends itself, more so than any other design of floor I know, to be laid by any mechanic in a manner depending upon the particular area to be floored. That is, he can begin installation at the edge of the room, the end of the room or the middle of the room. He can lay the stiles first or the section of boards first. In either event, the stiles and the boards become interlocked. The stiles being in position to receive another row of floor boards, these boards are positioned against the upper edge of the stile to form an interlocking connection therewith and this is repeated until the subfloor is covered by the stiles and floor boards and as a space is left at each end of the room for the boards to expand and contract, expansion and contraction is practically controlled in two directions as there is very little expansion of the stiles transversely in view of their width and the boards through their interlocking connection with the stiles are free to move independently of one another and in respect to the stiles so that they can freely expand as they take on moisture.

In either method of starting and laying a flooring as described above, either a few sections of stiles are laid or a few floor boards are laid in engagement with one another and the sections of the stiles are either interlocked with the ends of the floor boards or the floor boards are interlocked with the stiles to form an interlocking connection between the ends of the floor boards and the side edges of the stiles.

In the modification shown in Figure 8, the stile M is provided with tongues M' along its side edges adapted to extend into grooves N' formed on the ends of the adjacent floor boards N as in this modification the floor boards are formed with a groove at each end to receive tongues formed on the side edges of the stiles and instead of having the tongues and grooves of substantially V shape in cross section, the tongues and grooves are of conventional shape.

In the modification shown in Figure 9, the stile O is provided with a groove O' along one edge and a tongue $O^2$ along its other edge and one end of the flooring board P is provided with a tongue P' adapted to extend into the groove of the stile and the other end of the floor board P is provided with a groove $P^2$ to receive the tongue $O^2$ of the stile to form a tongue and groove connection between the stile and the floor boards. In this construction the floor boards are formed with a tongue at one end and a groove at the other.

When it is desired to form a prefinished floor of boards of undetermined promiscuous widths in accordance with my invention, and with the well known Cromar method of manufacturing prefinished flooring as disclosed in the Dittmar Reissue Patent 14,660, dated June 10, 1919, it is only necessary to round or bevel the upper edges of the sections of the floor units to prevent any slight unevenness of a floor from being observed by the eye as shown in Figures 10, 11 and 12.

In Figures 10, 11 and 12 I have shown prefinished stiles Q with flat under sides having saw kerfs and with rounded side edges Q' in contact with the rounded side edges of prefinished flooring units R, the grooves in the under sides of the stiles being extended to form mastic receiving grooves $Q^2$ and the ends of the units R cut away as shown at $R^2$. The abutting ends of the sections of the stiles are rounded as shown at $Q^3$ and cut away on their under side as clearly shown. The side edges of the floor boards of the units R are provided with mastic receiving grooves $R^3$ and the upper edges are rounded as shown at $R^4$ and the under sides cut away. In these figures I have shown a modified form of tongue and groove and like illustrated in Figures 8 and 9, the underside of the stiles are flat.

I wish it to be clearly understood that I do not wish to limit myself to the particular shape of the tongue and groove used for forming the interlocking connection between the floor boards and the stiles and between the sections of the stiles nor do I wish to limit myself to the particular shape of the mastic receiving grooves shown and described as I am aware that various changes can be made without departing from the spirit of my invention and that any form of tongue and groove can be used with a stile having a flat under surface or with a stile having a rounded under surface to allow it to rock without departing from the spirit of my invention, it, of course, being understood that the construction of forming an interlocking connection as illustrated in Figures 10, 11 and 12 can be used in connection with the construction illustrated in the other figures.

While in the preferred embodiment of my invention I show the abutting ends of the sections of the stiles interlocked together, I am fully aware that a floor can be formed of sectional stiles having abutting ends and while I have shown various details of construction of the stiles and floor boards, my invention consists broadly in constructing a composite floor from commercial boards of undetermined promiscuous widths arranged on a bed of mastic between stiles in such a manner that the boards and stiles are interlocked together so that the boards are free to expand and contract in two directions.

From the foregoing description it will be seen that I have provided a composite floor composed of a subfloor having a layer of plastic mastic disposed thereon on which are arranged rows of floor boards of undetermined promiscuous widths having their side edges only in contact with one another and having their ends interlocked with sectional stiles by a tongue and groove connection which allows the floor boards to expand and contract independent of one another and independent of the stiles, the stiles performing the function of guiding the floor boards and holding the floor boards in position on the subfloor whereby I am able to practically control the expansion in two directions.

What I claim is:

1. A composite floor formed of flooring units arranged in mastic on a subfloor in rows between sectional stiles and connected thereto at their ends by tongue and groove connections, the under side of the stiles being rounded transversely to allow said stiles to rock on the subfloor.

2. A composite floor formed of flooring units of promiscuous widths and lengths arranged in mastic on a subfloor in rows between sectional end matched stiles and connected thereto at their ends by tongue and groove connections, the under side of the stiles being rounded transversely to allow said stiles to rock on the subfloor.

3. A composite floor comprising, in combination, a subfloor, a layer of adhesive mastic arranged on said subfloor and adhering thereto, a plurality of sectional wooden stiles and a plurality of wooden floor boards of undetermined promiscuous widths arranged on said layer of mastic and adhering thereto, the stiles being arranged on the sections of subfloor with their abutting ends in engagement with one another to form guideways, the floor boards of undetermined promiscuous widths being arranged on the subfloor in rows between the stiles with their side edges in contact with one another and interlocked at their ends to the stiles by tongue and groove sliding connections to permit each board to move independently in respect to one another longitudinally in two directions in the guideway formed by the stiles as said boards expand and contract.

4. A composite floor comprising, in combination, a subfloor, a layer of adhesive mastic arranged on said subfloor and adhering thereto, a plurality of sectional wooden stiles and a plurality of wooden floor boards of undetermined promiscuous widths arranged in said layer of mastic and adhering thereto, the stiles being arranged on the sections of subfloor with their abutting ends interlocked together to form guideways, the floor boards of undetermined promiscuous widths being arranged on the subfloor in rows between the stiles with their side edges in contact with one another and interlocked at their ends to the stiles by tongue and groove sliding connections to permit each board to move independently in respect to one another longitudinally in two directions in the guideway formed by the stiles as said boards expand and contract.

5. A composite floor comprising, in combination, a subfloor, a layer of adhesive mastic arranged on said subfloor and adhering thereto, a plurality of sectional wooden stiles and a plurality of wooden floor boards of undetermined promiscuous widths arranged on said layer of mastic and adhering thereto, the stiles being arranged on the sections of subfloor with their abutting ends in engagement with one another to form guideways, the floor boards of undetermined promiscuous widths having master receiving grooves in their side edges being arranged on the subfloor in rows between the stiles with their side edges in contact with one another and interlocked at their ends to the stiles by tongue and groove sliding connections to permit each board to move independently in respect to one another longitudinally in two directions in the guideway formed by the stiles as said boards expand and contract.

6. A composite floor comprising, in combination, a subfloor, a layer of adhesive mastic arranged on said subfloor and adhering thereto, a plurality of sectional wooden stiles and a plurality of wooden floor boards of undetermined promiscuous widths arranged on said layer of mastic and adhering thereto, the stiles being arranged on the sections of subfloor with their abutting ends in engagement with one another to form guideways, and interlocked together, the floor boards of undetermined promiscuous widths having master receiving grooves in their side edges being arranged on the subfloor in rows between the stiles with their side edges in contact with one another and interlocked at their ends to the stiles by tongue and groove sliding connections to permit each board to move independently in respect to one another longitudinally in two directions in the guideway formed by the stiles as said boards expand and contract.

7. A composite floor comprising, in combination, a subfloor, a layer of adhesive mastic arranged on said subfloor and adhering thereto, a plurality of sectional wooden stiles and a plurality of wooden floor boards of undetermined promiscuous widths arranged on said layer of mastic and adhering thereto, the sections of the stiles being arranged on the subfloor with their abutting ends in engagement with one another, the floor boards of undetermined promiscuous widths being arranged on the subfloor in rows between the stiles with their side edges in contact with one another, each section of the stile being provided with a substantially V-shaped tongue along each side edge, each floor board being provided with a substantially V-shaped groove at each end to receive the tongues of the stiles to form a sliding interlocking connection to permit each board to move independently in two directions on the guideways formed by the stiles as said boards expand and contract.

KENNETH E. CROOKS.